United States Patent
Rhu et al.

(10) Patent No.: US 11,365,143 B2
(45) Date of Patent: Jun. 21, 2022

(54) COW EXCRETA TREATMENT APPARATUS AND METHOD

(71) Applicant: BKT CO., LTD., Daejeon (KR)

(72) Inventors: Daehwan Rhu, Yeoju-si (KR); Minki Jung, Daejeon (KR); Jaegwan Jang, Daejeon (KR)

(*) Notice: Subject to any disclaimer, the term of this patent is extended or adjusted under 35 U.S.C. 154(b) by 0 days.

(21) Appl. No.: 17/052,815

(22) PCT Filed: Jun. 10, 2019

(86) PCT No.: PCT/KR2019/006966
§ 371 (c)(1),
(2) Date: Nov. 19, 2020

(87) PCT Pub. No.: WO2019/245209
PCT Pub. Date: Dec. 26, 2019

(65) Prior Publication Data
US 2021/0363043 A1    Nov. 25, 2021

(30) Foreign Application Priority Data
Jun. 18, 2018  (KR) .......................... 10-2018-0069518

(51) Int. Cl.
*C02F 9/00*    (2006.01)
*C02F 3/00*    (2006.01)
(Continued)

(52) U.S. Cl.
CPC ................ *C02F 9/00* (2013.01); *C02F 3/006* (2013.01); *C02F 11/02* (2013.01); *C02F 1/20* (2013.01);
(Continued)

(58) Field of Classification Search
CPC ...... C02F 9/00; C02F 1/20; C02F 1/24; C02F 1/66; C02F 3/1215; C02F 3/20;
(Continued)

(56) References Cited

U.S. PATENT DOCUMENTS 6,569,332 B2 * 5/2003 Ainsworth ............. C12M 41/12
                                                    210/603
2002/0074287 A1   6/2002 Park et al.
(Continued)

FOREIGN PATENT DOCUMENTS

JP            4902468 B2      3/2012
JP            2017-519630     7/2017
(Continued)

OTHER PUBLICATIONS

English Specification of 10-0953058.
(Continued)

*Primary Examiner* — Fred Prince
(74) *Attorney, Agent, or Firm* — Antonio Ha & U.S. Patent, LLC

(57) ABSTRACT

Disclosed are a cow excreta treatment apparatus and method. According to an aspect of the present embodiment, in a cow excreta treatment apparatus which treats cow excreta wastewater, provided is an aerobic reaction chamber for improving the aggregation and sedimentation characteristics of fine solids, the aerobic reaction chamber comprising: an air blow pipe for supplying air; a vertical membrane for preventing the outflow of raw water; and a discharge pipe for discharging air and treated water and removing bubbles generated in the aerobic reaction chamber.

7 Claims, 10 Drawing Sheets

(51) Int. Cl.

| | |
|---|---|
| *C02F 11/02* | (2006.01) |
| *C02F 1/20* | (2006.01) |
| *C02F 1/24* | (2006.01) |
| *C02F 1/66* | (2006.01) |
| *C02F 3/12* | (2006.01) |
| *C02F 3/20* | (2006.01) |
| *C02F 3/30* | (2006.01) |
| *C02F 11/04* | (2006.01) |
| *C02F 1/38* | (2006.01) |
| *C02F 1/52* | (2006.01) |
| *C02F 3/28* | (2006.01) |
| *C02F 1/00* | (2006.01) |
| *C02F 101/10* | (2006.01) |
| *C02F 101/16* | (2006.01) |
| *C02F 103/20* | (2006.01) |
| *C05F 3/00* | (2006.01) |

(52) U.S. Cl.
CPC ............... *C02F 1/24* (2013.01); *C02F 1/38* (2013.01); *C02F 1/52* (2013.01); *C02F 1/66* (2013.01); *C02F 3/1215* (2013.01); *C02F 3/20* (2013.01); *C02F 3/28* (2013.01); *C02F 3/303* (2013.01); *C02F 3/305* (2013.01); *C02F 3/307* (2013.01); *C02F 11/04* (2013.01); *C02F 2001/007* (2013.01); *C02F 2101/105* (2013.01); *C02F 2101/163* (2013.01); *C02F 2101/166* (2013.01); *C02F 2103/20* (2013.01); *C02F 2209/006* (2013.01); *C05F 3/00* (2013.01)

(58) Field of Classification Search
CPC .......... C02F 3/303; C02F 3/305; C02F 3/307; C02F 11/04; C02F 2001/007; C02F 2101/105; C02F 2101/163; C02F 2101/166; C02F 2103/20; C02F 1/38; C02F 1/52; C02F 3/28; C02F 2209/006; C02F 3/006; C02F 11/02; C05F 3/00
USPC ......... 210/603, 605, 221.1, 221.2, 259, 903, 210/906; 71/10, 21
See application file for complete search history.

(56) References Cited

U.S. PATENT DOCUMENTS

| | | | |
|---|---|---|---|
| 2005/0000906 A1* | 1/2005 | Blais | C05F 3/00 210/221.1 |
| 2007/0256463 A1* | 11/2007 | Davis | C05F 3/00 71/11 |
| 2007/0289921 A1 | 12/2007 | Choi et al. | |
| 2019/0352238 A1* | 11/2019 | Harrison | C02F 9/00 |
| 2021/0114950 A1* | 4/2021 | Krivov | C02F 3/34 |

FOREIGN PATENT DOCUMENTS

| | | |
|---|---|---|
| KR | 10-0703890 | 4/2007 |
| KR | 10-0735545 | 7/2007 |
| KR | 10-2009-0022168 | 3/2009 |
| KR | 10-0925531 | 11/2009 |
| KR | 10-0953058 | 4/2010 |
| KR | 10-1157819 | 6/2012 |
| KR | 10-2015-0143464 | 12/2015 |
| KR | 10-1691439 | 12/2016 |

OTHER PUBLICATIONS

English Specification of JP4902468B2.
Pramod K. Pandey, *Escherichia coli* persistence kinetics in dairy manure at moderate, mesophilic, and thermophilic temperatures. Bioprocess and Biosystems Engineering 2015, vol. 38, pp. 457-467.
SewerageFacilityStandards published by Korea Water and Sewer Association. 2011, p. 365, 615, 687, 690.
English Specification of 10-0735545.
English Specification of 10-0703890.
English Specification of 10-1157819.
English Specification of 2017-519630.
English Specification of 10-2009-0022168.
Eoglish Specification of 10-0925531.
English Specification of 10-2015-0143464.
English Specification of 10-1691439.

* cited by examiner

COW EXCRETA TREATMENT APPARATUS AND METHOD

TECHNICAL FIELD

The present invention relates to an apparatus and method for treating dairy manure that effectively removes nitrogen and phosphorus from dairy manure by adding an aeration tank.

BACKGROUND ART

The description of the Discussion of Related Art section merely provides information that may be relevant to embodiments of the disclosure but should not be appreciated as necessarily constituting the prior art.

Typically, livestock farmers feed the cows with fiber-containing assistant fodder and nutrients-mixed fodder in addition to main fodder, increasing the milk production from cows. In addition, livestock farmers feed cows with CaCO3-added fodder to cows so that calcium may be included in the produced milk. As such, because cows are fed with fodder containing fiber, nutrients and CaCO3, dairy manure that has different characteristics from those of other livestock. In particular, when compared to pig manure, the dairy manure has more noticeable characteristics as follows.

The biological oxygen demand (BOD) of dairy manure is about 20,000 to 25,000 mg/L, and the suspended solid (SS) is about 60,000 to 80,000 mg/L. The total nitrogen (TN) in dairy manure is about 6,000 to 7,000 mg/L, and the total phosphorus (TP) is about 1,000 to 1,500 mg/L. The measured values for such dairy manure are similar to those of pig manure. However, due to the influence by the CaCO3-added fodder, the pH of dairy manure is about 8.0 to 8.5 higher than that of pig manure, and the alkalinity thereof is very high, e.g., 10,000 to 15,000 mg/L compared to 7,000 mg/L of pig manure.

The general dairy manure treatment process is as follows. The anaerobic digestor converts organic matter in dairy manure into methane gas. Methane gas generated here is reused as an electric energy source. Organic matter that is not converted to methane gas contains a large amount of fiber, and the fiber is removed by a fiber separator. The micro-solids remaining in the anaerobic digestor are separated by DAF(Dissolved Air Flotation) or centrifugal separator and used as a raw material for fertilizer. In the effluent from fiber separator and DAF, the concentration of suspended solids (SS) is reduced to 10,000 mg/L, and the treated water flows into a three-stage lagoon treatment system. The treated water that has stayed in the lagoon for a long time is applied into the farmland. Nitrogen and phosphorus components in dairy manure may not be properly removed by such a conventional treatment process. When treated water from which nitrogen and phosphorus components have not been properly removed is applied into farmland over a long period of time, soil and groundwater could be contaminated.

In recent years, regulations on the discharge of manure are expanding worldwide. In particular, a manure discharge regulation plans to reduce the amount of manure to 1/10 of the existing manure amount is expected to take effect in Indiana, USA. In order to reduce manure discharge, a method of spreading manure over farmland that is more than 10 times larger land than the existing area, and a method of reducing the amount of manure entering the farmland by removing more than 90% of nitrogen in the treated water are considered. However, since most of the land is already used as farmland, it is impractical to secure farmland that is more than 10 times larger than the existing area. That is, removing nitrogen and phosphorus in the treated water and reducing the degree of contamination by using a manure treatment process is currently the only solution.

Nitrogen is removed biologically through nitrification and denitrification, and nitrification proceeds in two stages.

Step 1—Ammonia Oxidation: $NH4^+ + 1.5O_2 \rightarrow NO_2^- + 2H^+ + H_2O$

Step 2—Nitrite Oxidation: $NO_2^- + 0.5O_2 \rightarrow NO3^-$

In the denitrification reaction, nitrogen is removed by using a carbon source, which is as an electron donor, and 4 to 5 g of organic matter is required to denitrify 1 g of nitrogen. In the conventional dairy manure treatment process, most of the organic matter is converted to methane gas by anaerobic digestion, so that the organic matter required for the denitrification is insufficient. Therefore, the conventional dairy manure treatment process has a drawback in that it may not sufficiently remove nitrogen in dairy manure.

Meanwhile, nitrogen can also be removed by ammonia stripping. Ammonia stripping is a method of removing nitrogen by converting 90% of ammonium ions ($NH_4^+$) into ammonia ($NH_3$) and then stripping dinitrogen. To remove nitrogen by the ammonia stripping method, the pH value of dairy manure needs be 11 or higher. Because dairy manure has high alkalinity and acidity, a large amount of chemicals should be added to dairy manure to increase the pH value. Typically, 35,000 mg as CaCO3/L of NaOH needs to be additionally supplied to raise the pH of dairy manure up to 11. In this respect, the nitrogen removal process using the ammonia stripping method is economically inefficient.

Nitrogen can also be removed by a shortcut nitrogen removal process using a partial nitritation-anammox process. The shortcut nitrogen removal method oxidates ammonia nitrogen up to the nitride ($NO_2^-$) step and utilizing ammonia nitrogen as an electron donor, removing nitrogen by deammonification. When nitrogen is removed using this method, it is possible to reduce oxygen by 60% and carbon source by 100% compared to a conventional nitrification-denitrification process. The success or failure of the partial nitritation-anamox process is to achieve stable nitritation, and therefore, the concentration of the solids in the influent needs to be kept below 2,000 mg/L. This is because when the solid concentration is high, ammonium oxidation bacteria (AOB) may not be stably secured in the reactor. In particular, dairy manure has a high pH and alkalinity and contains various high concentrations of ionic substances, and thus, floating solids are not well coagulated even when a flocculant or polymer is injected. Therefore, unless the concentration of suspended solids is reduced to 2,000 mg/L or less, it is impossible to treat dairy manure using the partial nitritation-anammox process, and as a result, nitrogen in manure may not be effectively removed.

DETAILED DESCRIPTION OF THE INVENTION

Technical Problems

An embodiment of the present invention is to provide a dairy manure treatment apparatus and method capable of converting organic matter components of dairy manure into methane gas using anaerobic digestion and effectively separating solids remaining in the dewatered water.

An embodiment of the present invention is to provide an apparatus and method for treating dairy manure capable of effectively separating micro-solids by improving the flocculation and precipitation properties of micro-solids using an aeration tank.

An embodiment of the present invention is to provide an apparatus and method for treating dairy manure capable of stably removing nitrogen remaining in treated water using an anammox reactor after solid-liquid separation.

Means for Resolving Problems

According to an embodiment of the present invention, there is provided an aeration tank improving flocculation and sedimentation characteristics in a dairy manure treatment apparatus treating dairy manure, air supplied through diffuser and exhausted through discharge pipe transports treated water and removes bubbles generated in the aeration tank.

According to an embodiment of the present invention, the air supplied aeration tank strips carbon dioxide and results in increasing pH in the aeration tank and combining calcium and phosphorus in the dairy manure.

According to an embodiment of the present invention, a time during which the dairy manure is retained may be adjusted by properties of the raw water.

According to an embodiment of the present invention, there is provided an apparatus for treating dairy manure that removes nitrogen and phosphorus from dairy manure and to discharge to farmland, comprising an anaerobic digester for converting organic matter of dairy manure into methane gas using an anaerobic reaction, a fiber separator for separating fibers present in the organic matter not converted to the methane gas, an aeration tank for raising the pH of micro-solids remaining in the treated water after the fibers are separated, a flotation tank for flocculating or floating the micro-solids, a partial nitritation tank for converting ammonia nitrogen remaining in the treated water after the micro-solids have been oxidized into nitrite nitrogen, an anammox reactor for removing the nitrite nitrogen using a shortcut nitrogen removal reaction, and a sedimentation/storage tank for removing nitrate nitrogen by inducing endogenous denitrification of the nitrate nitrogen.

According to an embodiment of the present invention, the flotation tank separates the micro-solids using a flocculant and a flocculating aid.

According to an embodiment of the present invention, the sedimentation/storage stabilizes the treated water by sedimentation and storing the treated water discharged from the anammox reactor.

According to an embodiment of the present invention, there is provided a method for treating dairy manure using a dairy manure treatment apparatus, comprising introducing dairy manure containing a high concentration of organic matter into the treatment apparatus, converting part of the high-concentration organic matter into methane gas by an anaerobic digester, separating a fibrous component of the organic matter not converted to the methane gas, supplying air to increase the pH of dairy manure from which the fibrous component has been separated; flocculating or floating micro-solids using a flocculant and a flocculating aid; converting ammonia nitrogen in the treated water from which the micro-solids have been removed into nitrite nitrogen, removing the nitrogen using a shortcut nitrogen removal reaction, and removing nitrate nitrogen by inducing endogenous denitrification of the nitrate nitrogen.

Effects of the Invention

As described above, according to an embodiment of the present invention, organic matter components of dairy manure may be converted into methane gas using anaerobic digestion, and the fibrous components in the organic matter not converted to methane gas may be separated. The separated fibers may be recycled as a bed for livestock.

According to an embodiment of the present invention, as the flocculation and precipitation properties of micro-solids are improved by using an aeration tank, it is possible to significantly save the amount of chemicals required for flocculation and precipitation.

According to an embodiment of the present invention, by using an aeration tank, the pH of micro-solids is increased, and calcium and phosphorus in dairy manure react to form hydroxyapatite, so that phosphorus in the dairy manure may be effectively removed. More than 30% of ammonia nitrogen can be removed, results in shortening the residence time of the subsequent process.

According to an embodiment of the present invention, it is possible to reuse micro-solids containing a large amount of calcium and phosphorus as a raw materials for composting by attaching air to micro-solid particles and floating them using a flocculant and a flocculating aid.

According to an embodiment of the present invention, the dairy manure from which the micro-solids have been removed are introduced into the anammox reactor, and nitrogen remaining in the dairy manure is removed by using a shortcut nitrogen removal reaction, thereby significantly reducing the nitrogen component in the effluent flowing to the farmland.

MODE FOR CARRYING OUT THE INVENTION

Various changes may be made to the present invention, and the present invention may come with a diversity of embodiments. Some embodiments of the present invention are shown and described in connection with the drawings.

However, it should be appreciated that the present disclosure is not limited to the embodiments, and all changes and/or equivalents or replacements thereto also belong to the scope of the present disclosure.

Similar reference denotations are used to refer to similar elements throughout the drawings.

The terms "first" and "second" may be used to describe various components, but the components should not be limited by the terms.

The terms are used to distinguish one component from another.

For example, a first component may be denoted a second component, and vice versa without departing from the scope of the present disclosure.

The term "and/or" may denote a combination(s) of a plurality of related items as listed or any of the items.

It will be understood that when an element or layer is referred to as being "on," "connected to," "coupled to," or "adjacent to" another element or layer, it may be directly on, connected, coupled, or adjacent to the other element or layer, or intervening elements or layers may be present.

In contrast, when a component is "directly connected to" or "directly coupled to" another component, no other intervening components may intervene therebetween.

The terms as used herein are provided merely to describe some embodiments thereof, but not to limit the present invention.

As used herein, the singular forms "a," "an," and "the" are intended to include the plural forms as well, unless the context clearly indicates otherwise.

As used herein, the term "comprise," "include," or "have" should be appreciated not to preclude the presence or addability of features, numbers, steps, operations, components, parts, or combinations thereof as set forth herein.

Unless otherwise defined, all terms including technical and scientific terms used herein have the same meaning as commonly understood by one of ordinary skill in the art to which the embodiments of the present disclosure belong.

It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The components, processes, steps, or methods according to embodiments of the disclosure may be shared as long as they do not technically conflict with each other.

Figure 1:
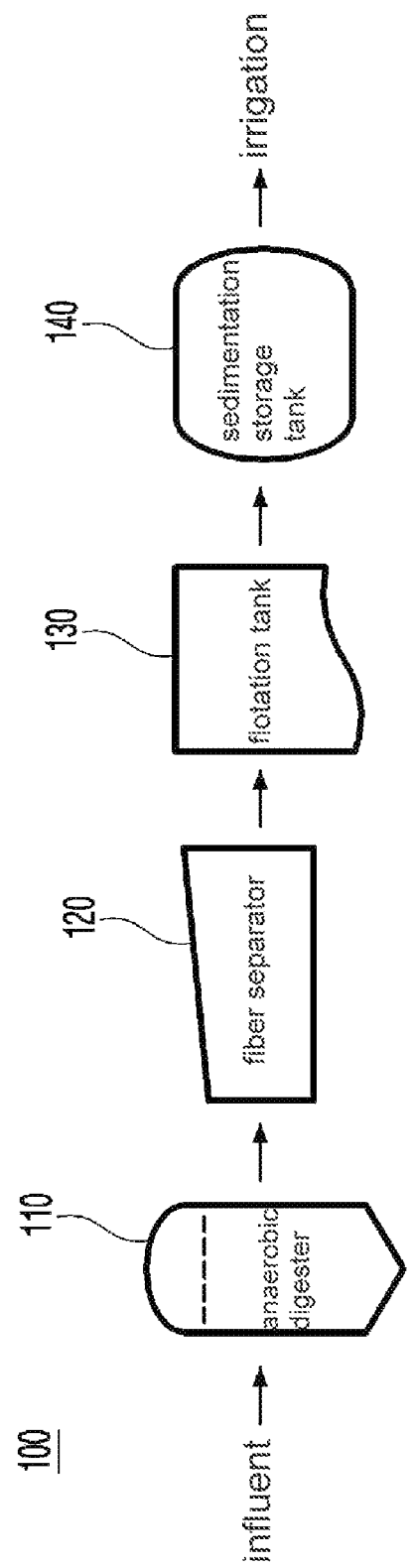
FIG. 1 is a view illustrating a conventional dairy manure treatment apparatus.

FIG. 1 is a view illustrating a conventional dairy manure treatment apparatus.

The conventional dairy manure treatment apparatus 100 includes an anaerobic digester 110, a fiber separator 120, a flotation tank 130, and a sedimentation/storage tank 140.

The anaerobic digester tank 110 converts organic matter components in dairy manure into methane gas (or biogas). The anaerobic digester 110 finally decomposes organic matter into methane ($CH_4$) and carbon dioxide ($CO_2$) using anaerobic microorganisms under conditions in which oxygen does not exist. The anaerobic digester 110 converts biodegradable organic matter components in dairy manure into methane gas at a rate of about 70 to 90%, and organic matter components that are not converted to methane gas are treated by a subsequent process.

The fiber separator 120 separates fibrous components in organic matter that have not been converted to methane gas. As the fibers are separated, the fiber separator 120 discharges the treated water, in which micro-solids remain, into the flotation tank 130.

The flotation tank 130 separates micro-solids in the treated water using a dissolved air. The flotation tank 130 reduces the concentration of suspended solids (SS) in the treated water from which the micro-solids have been removed to 10,000 mg/L and discharges the treated water out to the sedimentation/storage tank 140.

The sedimentation/storage tank 140 may be configured in the form of a three-stage lagoon, and the treated water introduced into the sedimentation/storage tank 140 is retained for a long time. The treated water stabilized by the sedimentation/storage tank 140 is supplied to farmland by an irrigation facility and treated.

The dairy manure treated by the conventional dairy manure treatment apparatus 100 has a problem in that nitrogen and phosphorus in the treated water are not properly removed. In particular, when dairy manure with a high concentration of pH, alkalinity, and ionic substances is treated in the flotation tank 130, flocculation of micro-solids is not properly performed whatever chemicals are added in the floatation tank 130 at any concentration, so that it is quite difficult to remove suspended solids. When the treated water from which the micro-solids are not separated is discharged to the sedimentation/storage tank 140, nitrogen and phosphorus, which are organic matter in dairy manure, are supplied to farmland for a long period of time, thereby increasing contamination of soil and groundwater.

Figure 2:
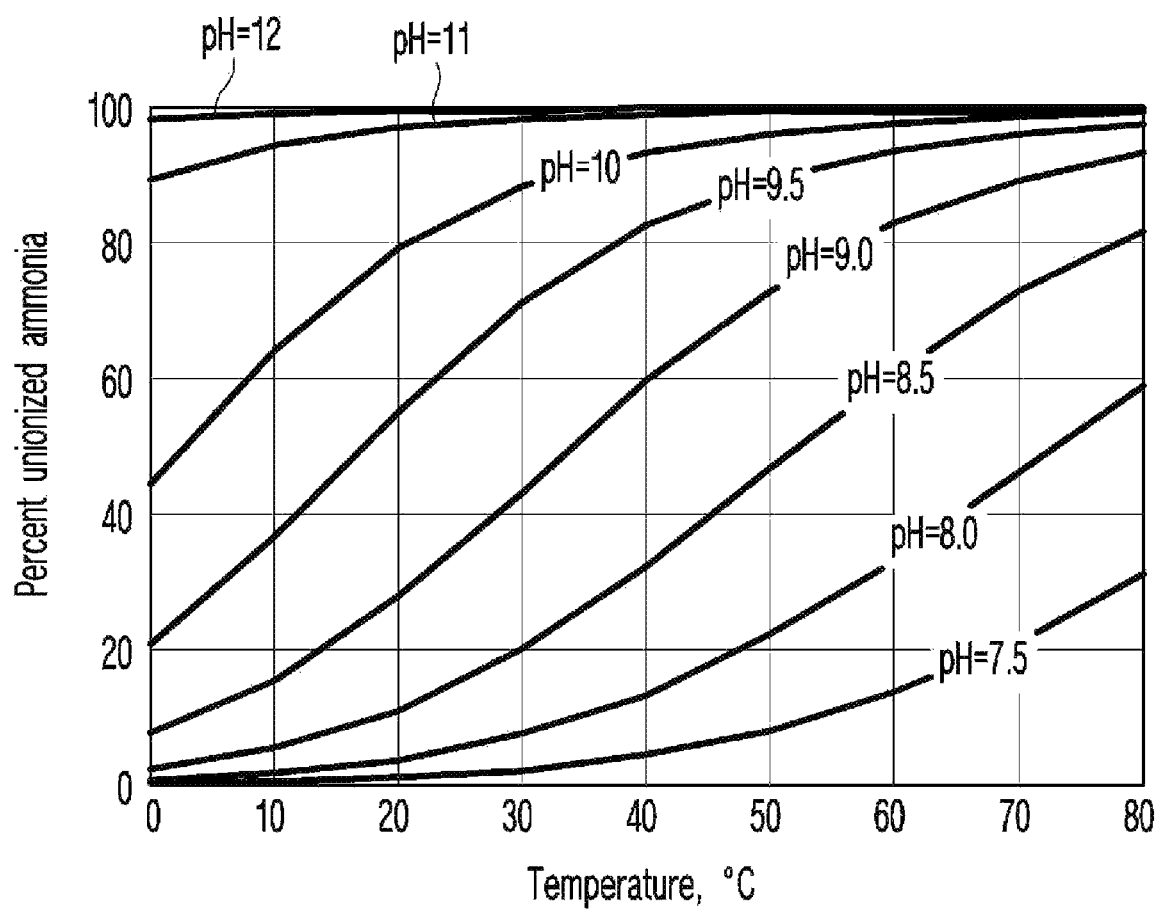
FIG. 2 is a graph illustrating a change in nitrogen properties according to temperature and pH in a conventional dairy manure treatment apparatus.
Figure 3:
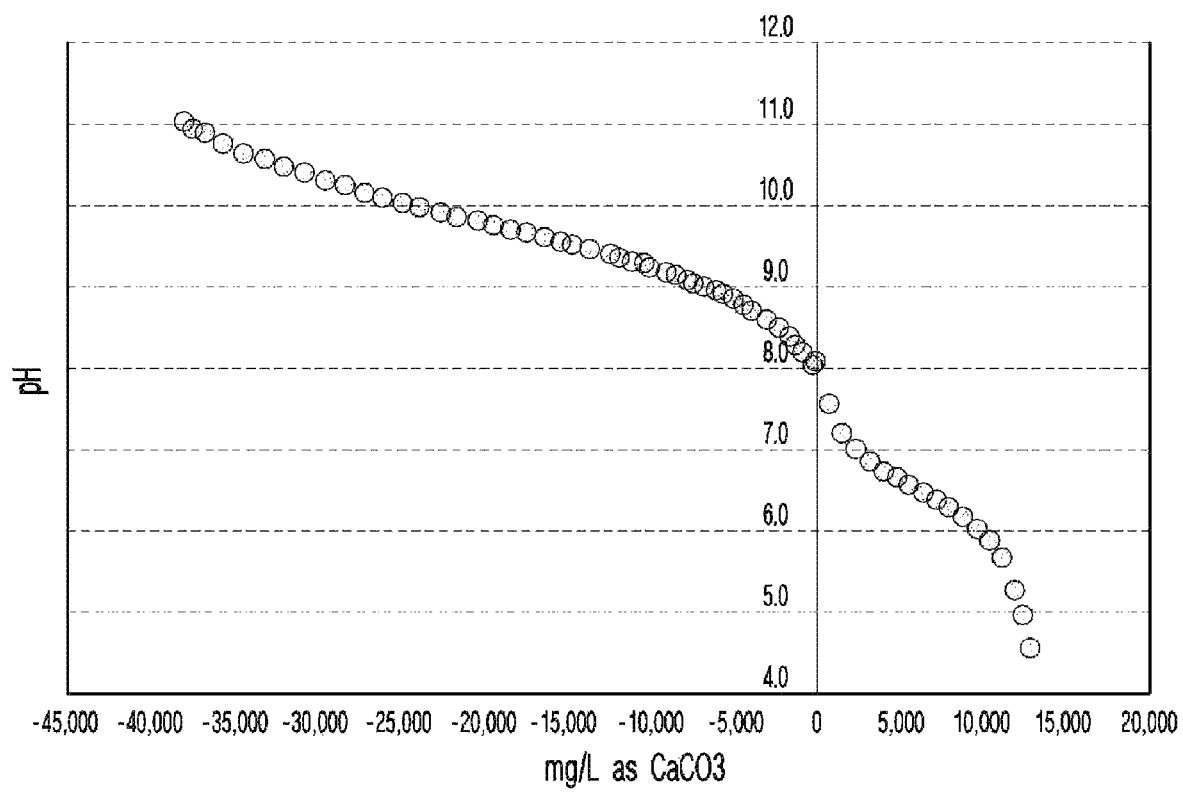
FIG. 3 is a view illustrating a change in pH according to chemical injection in a conventional dairy manure treatment apparatus.

FIG. 2 is a graph illustrating a change in nitrogen properties according to temperature and pH in a conventional dairy manure treatment apparatus, and FIG. 3 is a view illustrating a change in pH according to chemical injection in a conventional dairy manure treatment apparatus.

As mentioned in the background art section, the conventional dairy manure treatment apparatus 100 may remove nitrogen in the treated water using ammonia stripping. The conventional dairy manure treatment apparatus 100 removes nitrogen in the treated water by converting 90% of ammonium ions ($NH4^+$) to ammonia ($NH_3$) in order to remove 90% of nitrogen.

FIGS. 2 and 3, the pH value of dairy manure need be 11 or higher, and the temperature meets 50 to 80° C., so that the conventional dairy manurer treatment apparatus 100 may remove nitrogen using ammonia stripping. In particular, in order to have a pH value of 11 or higher in dairy manure, NaOH corresponding to 35,000 mg as $CaCO_3/L$ needs to be added. As such, the conventional dairy manure treatment apparatus 100 has economic inefficiency in that chemicals are excessively consumed.

Accordingly, the dairy manure treatment apparatus according to an embodiment of the present invention adopts an aeration tank to effectively remove nitrogen and phosphorus in dairy manure wastewater.

Figure 4:
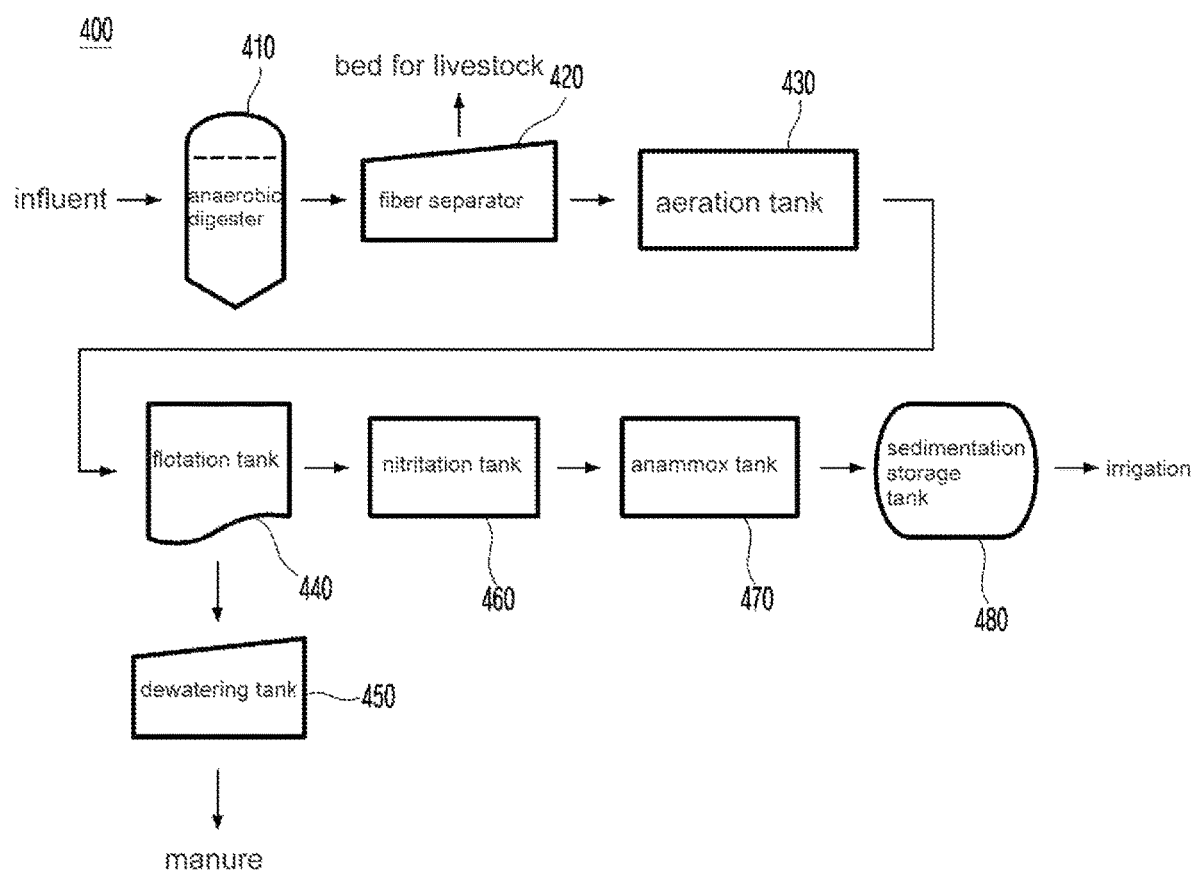
FIG. 4 is a view illustrating a dairy manure treatment apparatus according to an embodiment of the present invention.

FIG. 4 is a view illustrating a dairy manure treatment apparatus according to an embodiment of the present invention.

Referring to FIG. 4, the dairy manure treatment apparatus 400 according to an embodiment of the present invention includes an anaerobic digester 410, a fiber separator 420, an aeration tank 430, a flotation tank 440, a dewatering tank 450, a nitritation tank 460, an anammox tank 470, and a sedimentation/storage tank 480.

Dairy manure from which contaminants have been removed is introduced into the anaerobic digester tank 410. The anaerobic digester 410 converts organic matter in dairy manure into methane ($CH_4$) gas using acid-producing microorganisms and methane-producing microorganisms under anaerobic conditions. Methane gas generated in the dairy manure treatment process may be used for electricity production, and after purification, be mixed with fuel gas and used. The anaerobic digester 410 discharges organic matter components that have not been converted into methane gas to the fiber separator 420.

The fiber separator tank 420 removes fibrous components in the organic matter using a screen and a dehydrator, thereby reducing the concentration of organic matter in the fiber separator 420 from 4% to about 2%. Fiber separated from the organic matter has a low concentration of nitrogen and phosphorus and has good buffering power, so it may be, after dried, used as a bed for livestock. In order to remove the micro-solids remaining in the treated water after the fibrous components are removed, the fiber separator 420 discharges the micro-solids to the aeration tank 430.

The aeration tank 430 improves the sedimentation and flocculation properties of the micro-solids so that the micro-solids may be effectively removed from the flotation tank 440. Since micro-solids may not be removed by a general solid-liquid separation process, the dairy manure treatment apparatus 400 separates micro-solids using the aeration tank 430. The aeration tank 430 retains the micro-solids for about one to three days. At this time, the dissolved oxygen concentration in the aeration tank 430 is maintained at 1.0 to 2.0 mg/L. The aeration tank 430 receives oxygen from the air injected using a diffuser (not shown). Here, the diffuser has high oxygen transfer efficiency and degassing efficiency, and has characteristics of less clogging in the aeration tank. In general, the oxygen utilization rate is maintained at 22 to 26 $mgO_2$/L/hr, and the diffuser controls air supply so that the oxygen supplied to the aeration tank 430 is not insufficient. The aeration tank 430 is operated so that the hydraulic retention time (HRT) and the solid retention time (SRT) are the same without a sedimentation basin and sludge return. As a sedimentation basin and sludge return are omitted, the aeration tank 430 is easy to operate, and the process is simplified. The time during which the micro-solids stay in the aeration tank 430 varies depending on the properties of the incoming raw water and is typically determined to be within the range of 1 to 3 days. The aeration tank 430 also serves to adjust the flow rate at the same time, thereby helping the stable operation of the subsequent process.

The characteristics and effects of the aeration tank 430 are described in detail with reference to FIGS. 5 to 7.

Figure 5:
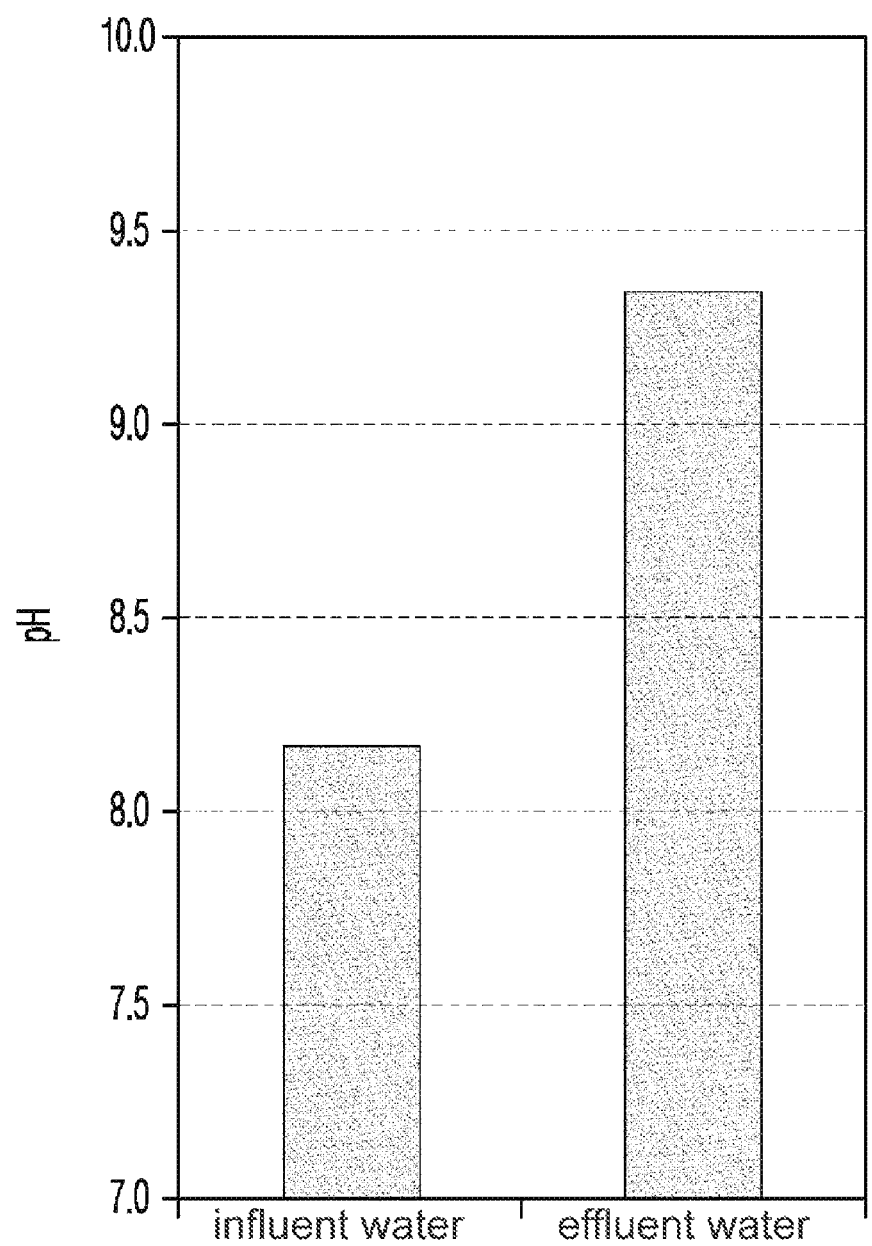
FIG. 5 is a graph illustrating a change in pH when a dairy manure treatment apparatus is adopted according to an embodiment of the present invention.
Figure 6:
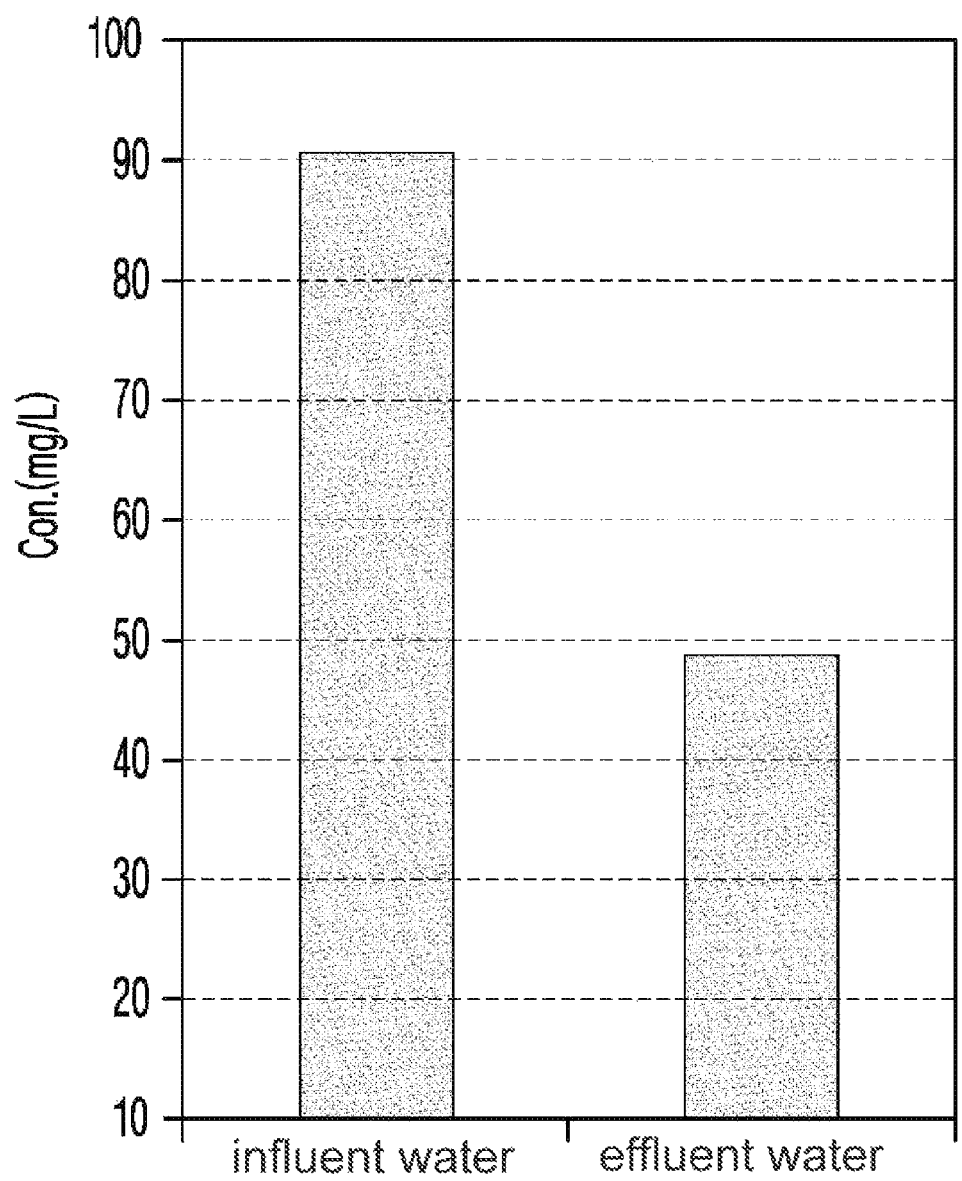
FIG. 6 is a graph illustrating a value resultant from removing phosphorus by adopting an aeration tank according to an embodiment of the present invention.

FIG. 5 is a graph illustrating changes in pH when the dairy manure treatment apparatus is adopted according to an embodiment of the present invention, and FIG. 6 is a graph illustrating values resultant from removing phosphorus by adopting an aeration tank according to an embodiment of the present invention. FIG. 7 is a graph illustrating values resultant from removing nitrogen by adopting an aeration tank according to an embodiment of the present invention.

Referring to FIG. 5, air is injected into the aeration tank 430 by a diffuser and, as the air is injected, carbon dioxide formed in the anaerobic digester 410 is stripped. Accordingly, the pH of dairy manure in the aeration tank 430 rises from 8.2 to 9.4 even without injecting additional chemicals into the aeration tank 430.

Figure 7:
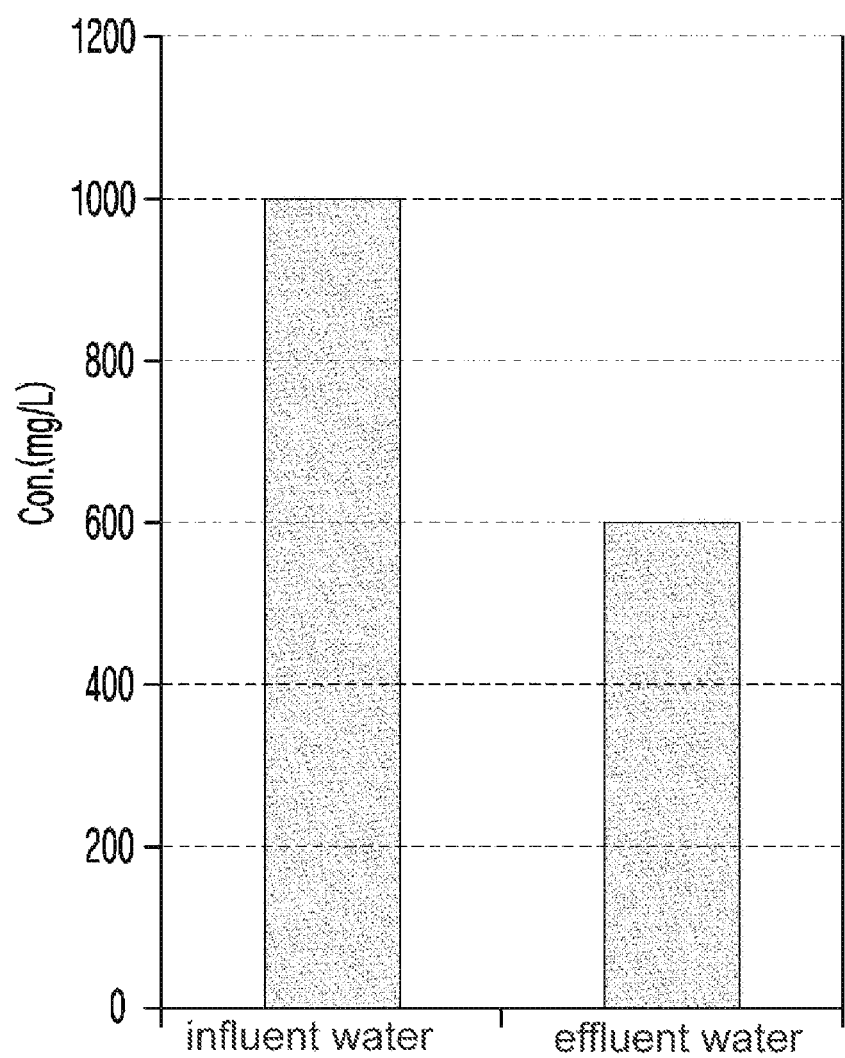
FIG. 7 is a graph illustrating a value resultant from removing nitrogen by adopting an aeration tank according to an embodiment of the present invention.

Meanwhile, as shown in FIGS. 6 and 7, as the pH is increased by the aeration tank 430, calcium and phosphorus contained in dairy manure react to form hydroxyapatite, and nitrogen and phosphorus are thus removed from the dairy manure. Moreover, as the pH in the aeration tank 430 increases, ammonium ions are converted to ammonia, and ammonia is removed at a rate of about 30 to 40% by stripping. This allows the residence time of the subsequent process to be shortened.

The structure of the aeration tank 430 is described in detail with reference to FIG. 8.

Figure 8:
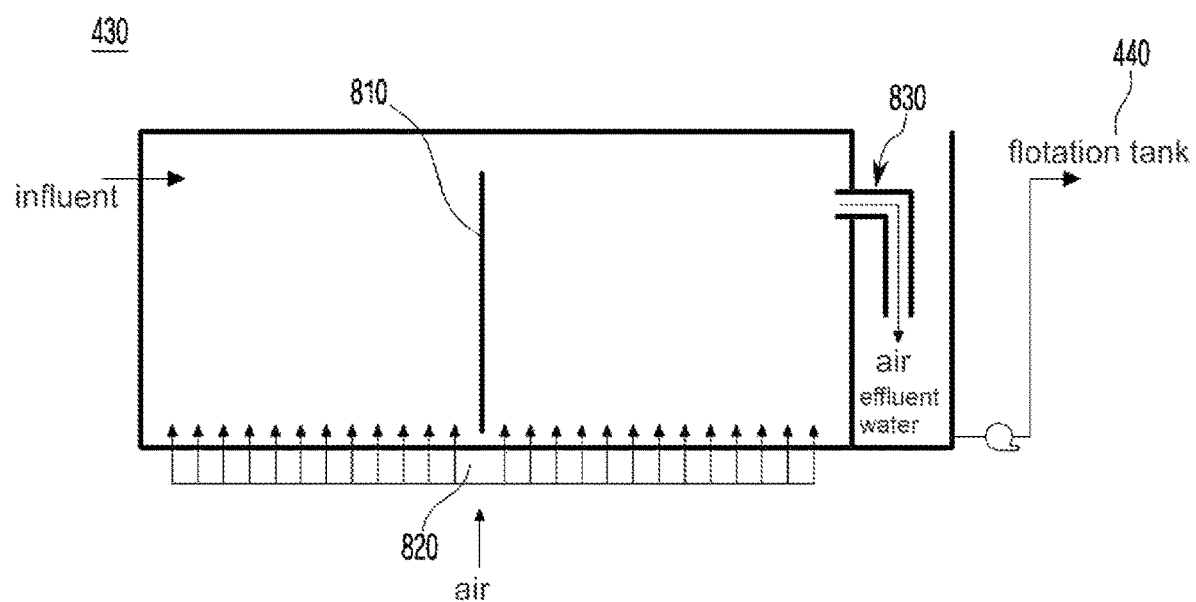
FIG. 8 is a view illustrating an aeration tank in which separate air and exhaust pipes are installed according to an embodiment of the present invention.

FIG. 8 is a view illustrating an aeration tank in which separate air and exhaust pipes are installed according to an embodiment of the present invention.

Referring to FIG. 8, the aeration tank 430 includes a vertical wall 810, a diffuser 820, and an exhaust pipe 830.

The vertical wall 810 separates the space of the aeration tank 430 to prevent raw water from being immediately discharged without being treated by the aeration tank 430 when the raw water is introduced.

The diffuser 820 is mainly installed on the bottom surface of the aerobic reaction tank 430. As air is injected by the diffuser 820, a large amount of bubbles is generated in the aeration tank 430. In general, the generated bubbles are removed by an antifoaming agent, but the dairy manure treatment apparatus 400 according to an embodiment of the present invention removes bubbles using the exhaust pipe 830 in the aeration tank 430.

The upper part of the aeration tank 430 has a closed structure, and the lower part thereof is configured to discharge air and effluent water. The exhaust pipe 830 is installed in the lower direction of the aeration tank 430, thereby removing bubbles generated in the aeration tank 430 as air is injected. Bubbles are discharged together with the treated water through the exhaust pipe 830 according to the discharge speed of the introduced air. The treated water from which the bubbles have been removed is discharged to the flotation tank 440.

Referring back to FIG. 4, the flotation tank 440 separates solids and liquids using an air flotation process. The treated water discharged from the aeration tank 430 is introduced into the flotation tank 440, and a flocculant and a flocculating aid are injected into the treated water. As the flocculant and the flocculating aid are injected, air is attached to the micro-solid particles, and the micro-solid particles in the flotation tank 440 are floated or suspended. By using 50 to 100 mg/L of flocculant and 50 to 100 mg/L of polymer in the flotation separation tank 440, the micro-solids may be flocculated.

Figure 9:
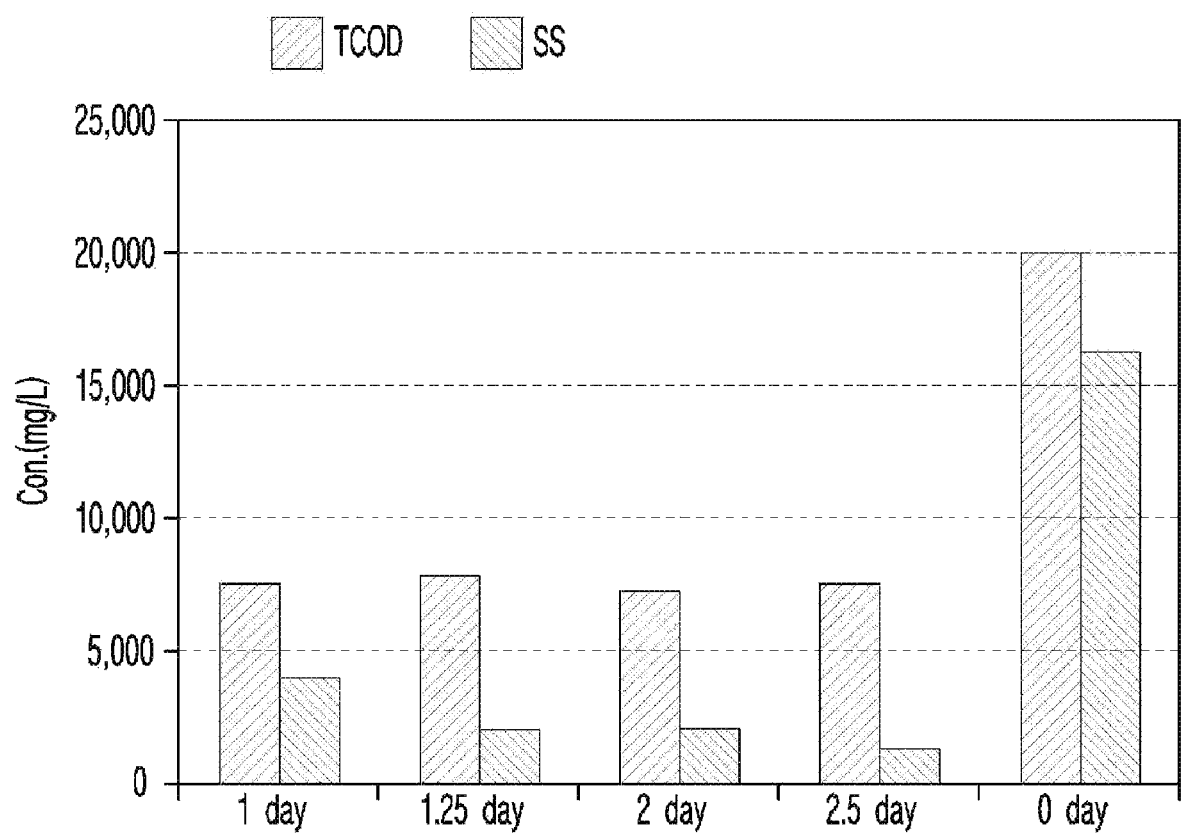
FIG. 9 is a graph illustrating the amount of micro-solids processed according to the residence time in an aeration tank according to an embodiment of the present invention.

FIG. 9 is a graph illustrating the amount of micro-solids processed according to the residence time in the aeration tank according to an embodiment of the present invention.

As shown in FIG. 9, as the time during which the suspended solids (SS) stay in the aeration tank 430 increases, the efficiency of processing the micro-solids increases. In particular, when the suspended solids (SS) stay in the aeration tank 430 for 1.25 days or more, the micro-solids are removed to less than 2,000 mg/L. That is, the dairy manure treatment apparatus 400 according to an embodiment of the present invention introduces the aeration tank 430 before the flotation tank 440, thereby improving the flocculation and sedimentation characteristics of the micro-solids to stably separate the micro-solids.

Referring back to FIG. 4, the dewatering tank 450 removes moisture from micro-solids that have undergone the air floatation process. Since the micro-solids separated by the flotation tank 440 contain a large amount of phosphorus bonded with calcium, the micro-solids from which moisture has been removed may be reused as fertilizer.

The effluent water from which the solids have been separated by the flotation tank 440 is introduced into the nitritation tank 460. The nitritation tank 460 converts 50% of ammonia nitrogen remaining in the treated water introduced from the flotation tank 440 into nitrite nitrogen. The nitritation tank 460 discharges the treated water to the anammox tank 470.

The anammox tank 470 removes nitrogen in the treated water using a shortcut nitrogen removal process. The anammox tank 470 discharges the treated water from which nitrogen has been removed to the sedimentation/storage tank 480.

The sedimentation/storage tank 480 retains the treated water discharged from the anammox tank 470 for a long time. The sedimentation /storage tank 480 further reduces the amount of nitrogen injected into the farmland by inducing endogenous denitrification of nitrate nitrogen, which is a by-product of the shortcut nitrogen reaction, to further remove nitrate nitrogen. The final treated water stabilized by this process is injected into farmland by irrigation facilities.

Figure 10:
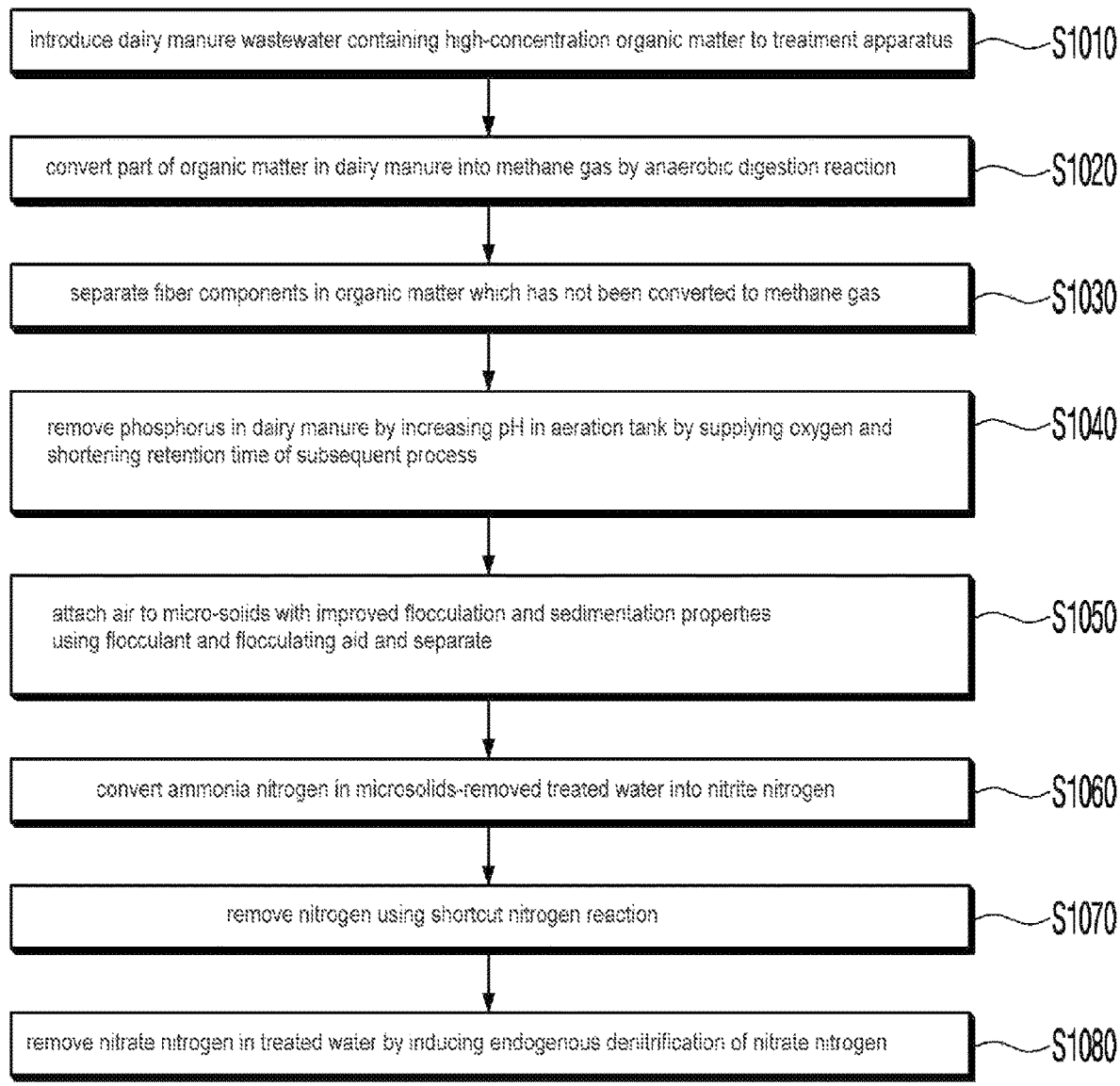
FIG. 10 is a flowchart illustrating a process of treating dairy manure by a dairy manure treatment apparatus according to an embodiment of the present invention.

FIG. 10 is a flowchart illustrating a process of treating dairy manure by the treatment apparatus according to an embodiment of the present invention.

The dairy manure flows into dairy manure treatment apparatus 400(S1010). At this time, the dairy manure wastewater contains a high concentration of organic matter.

The dairy manure treatment apparatus 400 converts a part of the organic matter in the manure into methane gas (S1020). The anaerobic digester 410 converts organic matter into methane gas using an anaerobic reaction, and the methane gas generated here is used as an electric energy source.

The dairy manure treatment apparatus 400 separates the fibrous components in the organic matter that has not been converted to methane gas (S1030). The fiber separator 420 separates fibrous components in organic matter using a screen and a dehydrator. The separated fibers may be reused as a bed for livestock.

The dairy manure treatment apparatus 400 raises the pH in the aeration tank 430 using the diffuser 820 (S1040). The aeration tank 430 is supplied with air by the diffuser 820, and the aeration tank 430 strips the carbon dioxide formed in the anaerobic digestion tank 410 to raise the pH of the manure. Accordingly, the aeration tank 430 allows calcium and phosphorus in manure to react to form hydroxyapatite, and converts ammonium ions into ammonia to decrease the residence time of the subsequent process.

The dairy manure treatment apparatus 400 separates the micro-solids, for which flocculation and sedimentation properties have been improved using a flocculant and a flocculating aid (S1050). The flotation tank 440 floats the micro-solids by attaching air to the micro-solids using a flocculant and a polymer. The separated micro-solids contain large amounts of calcium and phosphorus and may be reused as source of composting as they are dewatered.

The dairy manure treatment apparatus 400 converts ammonia nitrogen in the treated water from which the micro-solids have been removed to nitrite nitrogen (S1060). The nitritation tank 460 converts ammonia nitrogen remaining in the treated water into nitrite nitrogen.

The dairy manure treatment apparatus 400 removes nitrogen using a shortcut nitrogen removal reaction (S1070). The anammox tank 470 removes nitrite nitrogen using the anammox microorganism.

The dairy manure treatment apparatus 400 removes nitrate nitrogen in the treated water by inducing endogenous denitrification of nitrate nitrogen (S1080). The sedimentation/storage tank 480 stabilizes the treated water by sedimenting and storing the treated water. The final treated water is introduced into the farmland by irrigation facilities.

Although FIG. 10 illustrates that the steps are sequentially performed, this merely provides an embodiment of the disclosure.

It would readily be appreciated by a skilled artisan that the steps of FIG. 10 are not limited to the order shown but may rather be performed in a different order, one or more of the steps may simultaneously be performed, or other various modifications or changes may be made thereto without departing from the scope of the disclosure The steps or processes described above in connection with FIG. 10 may be implemented as computer-readable code in a recording medium.

The computer-readable recording medium includes all types of recording apparatuses storing data readable by a computer system.

The computer-readable recording medium includes a storage medium, such as a magnetic storage medium (e.g., a ROM, a floppy disk, or a hard disk), an optical reading medium (e.g., a CD-ROM or a DVD), or a carrier wave (e.g., transmission over the Internet).

Further, the computer-readable recording medium may be distributed to computer systems connected via a network, and computer-readable codes may be stored and executed in a distributed manner.

The above-described embodiments are merely examples, and it will be appreciated by one of ordinary skill in the art various changes may be made thereto without departing from the scope of the present invention.

Accordingly, the embodiments set forth herein are provided for illustrative purposes, but not to limit the scope of the present invention, and should be appreciated that the scope of the present invention is not limited by the embodiments.

The scope of the present invention should be construed by the following claims, and all technical spirits within equivalents thereof should be interpreted to belong to the scope of the present invention.

CROSS-REFERENCE TO RELATED APPLICATIONS

The instant patent application claims priority under 35 U.S.C. 119(a) to Korean Patent Application No. 10-2018-0069518, filed on Jun. 18, 2018, in the Korean Intellectual Property Office, the disclosure of which is herein incorporated by reference in its entirety.

The present patent application claims priority to other applications to be filed in other countries, the disclosures of which are also incorporated by reference herein in their entireties.

The invention claimed is:

1. An apparatus for treating dairy manure that removes nitrogen and phosphorus from manure wastewater and to discharge to farmland, the apparatus comprising:
   an anaerobic digester for converting organic matter of dairy manure into methane gas using an anaerobic digestion reaction;
   a fiber separator for separating fibers present in the organic matter not converted to the methane gas;
   an aeration tank for raising the pH of dairy manure wastewater remaining in the treated dairy manure after the fibers are separated;
   a flotation tank for flocculating or floating the-micro-solids;
   a nitritation tank for converting ammonia nitrogen remaining in the treated wastewater after the micro-solids have been removed into nitrite nitrogen;
   an anammox tank for removing the nitrite nitrogen using a shortcut nitrogen removal reaction; and
   a sedimentation/storage tank for removing nitrate nitrogen by inducing endogenous denitrification of the nitrate nitrogen.

2. The apparatus of claim 1, wherein the flotation tank separates the micro-solids using a flocculant and a flocculating aid.

3. The apparatus of claim 1, wherein the sedimentation/storage tank stabilizes the treated water by sedimenting and storing the treated water discharged from the anammox reaction tank.

4. The apparatus of claim 1, wherein the aeration tank comprising:
- a diffuser supplying air;
- a vertical wall preventing an outflow of raw water; and
- an exhaustion pipe discharging air and treated water and removing bubbles generated in the aeration tank.

5. The apparatus of claim 4, wherein the diffuser converts ammonium ions into ammonia by supplying air to the aeration tank and strips carbon dioxide to increase pH in the aeration tank to combine calcium and phosphorus in the dairy manure wastewater.

6. The apparatus of claim 4, wherein a time during which the dairy manure is retained may be adjusted by properties of raw water.

7. A method for treating dairy manure wastewater using a treatment apparatus, the method comprising:
- introducing dairy manure wastewater containing a concentration of organic matter into the treatment apparatus;
- converting part of the organic matter into methane gas by an anaerobic digestion reaction;
- separating a fibrous component of the organic matter not converted to the methane gas;
- supplying air to increase the pH of dairy manure wastewater from which the fibrous component has been separated;
- flocculating or floating micro-solids using a flocculant and a flocculating aid;
- converting ammonia nitrogen in the treated wastewater from which the micro-solids have been removed into nitrite nitrogen;
- removing the nitrogen using a shortcut nitrogen removal reaction; and
- removing nitrate nitrogen by inducing endogenous denitrification of the nitrate nitrogen.

* * * * *